United States Patent

Slee

[11] 4,438,740
[45] Mar. 27, 1984

[54] VALVE SEAT INSERTS FOR INTERNAL COMBUSTION ENGINES

[75] Inventor: Roger H. Slee, Warwick, England

[73] Assignee: Brico Engineering Limited, Coventry, England

[21] Appl. No.: 304,835

[22] Filed: Sep. 23, 1981

[30] Foreign Application Priority Data

Sep. 23, 1980 [GB] United Kingdom ............... 8030688

[51] Int. Cl.³ ........................... F01L 3/06; F02F 1/42
[52] U.S. Cl. ............................... 123/188 S; 123/306
[58] Field of Search ........................... 123/188 S, 306; 29/156.7 A

[56] References Cited

U.S. PATENT DOCUMENTS

| | | | |
|---|---|---|---|
| 1,512,952 | 10/1924 | Secor | 123/188 S |
| 2,921,571 | 1/1960 | Vogel et al. | 123/188 S |
| 3,640,261 | 2/1972 | Josey | 123/188 S |
| 3,653,368 | 4/1972 | Scherenberg | 123/188 S |
| 4,036,202 | 7/1977 | Weslake | 123/188 S |

FOREIGN PATENT DOCUMENTS 1560231 1/1980 United Kingdom .

*Primary Examiner*—Tony M. Argenbright
*Assistant Examiner*—W. R. Wolfe
*Attorney, Agent, or Firm*—Leydig, Voit, Osann, Mayer & Holt, Ltd.

[57] ABSTRACT

A valve seat insert surrounds an inlet valve of a reciprocating internal combustion engine and provides a seat for a movable valve. The flow characteristics of a charge of air or an air/fuel mixture leaving the inlet valve are determined at least in part by the form of the valve seat insert and these characteristics can affect the performance of the internal combustion engine. The improved valve seat insert defines an aperture through which the charge passes. The aperture has an area to one side of a plane including the axis of an annular valve engaging surface of the insert which is greater than the area of the aperture to the other side of the plane. The smaller of the areas is bounded by one or more curved sections. This insert can be used in an internal combustion engine or deflect a charge passing through the aperture and to give the charge a velocity profile which, for example, improves starting and reduces fuel consumption.

8 Claims, 4 Drawing Figures

VALVE SEAT INSERTS FOR INTERNAL COMBUSTION ENGINES

BACKGROUND TO THE INVENTION

1. Field of the Invention

The invention relates to valve seat inserts for inlet valves of reciprocating internal combustion engines.

2. Brief Description of the Prior Art

A conventional valve seat insert for an inlet valve of a reciprocating internal combustion engine comprises an annular valve-engaging surface extending around an aperture whose periphery is defined by an edge of the valve seat insert. The aperture is of circular cross-section and is centered on the axis of the annular valve-engaging surface.

Conventional valve seat inserts are therefore axi-symmetrical, and the flow of charge into the cylinder when the valve is open therefore also tends to be axi-symmetrical, within limits imposed by the shape of the combustion space. It is an object of the present invention to provide a new form of valve seat insert which, at least in certain cases, improves the operation of the engine. In a particular case, a substantially reduced fuel consumption and improved starting characteristics have been found.

SUMMARY OF THE INVENTION

According to a first aspect of the invention, there is provided a valve seat insert for an inlet valve of a reciprocating internal combustion engine and comprising an edge, means defining an aperture in the insert whose periphery is formed by said edge, an annular valve-engaging surface extending around said means defining an aperture, a first area of said means defining an aperture lying to one side of a plane including the axis of said annular valve-engaging surface, a second area of said means defining an aperture lying on the other side of said plane, said first area being larger than said second area, means bounding said second area including at least one curved section whereby an incoming charge passing to said insert in a path generally parallel to the axis of said valve-engaging surface is deflected from said path on passage through said means defining an aperture, the charge, when deflected, travelling in directions and having a velocity profile thereacross, which are controlled by the shape of said at least one curved section.

According to a second aspect of the invention, there is provided a reciprocating internal combustion engine comprising at least one cylinder, a valve-controlled inlet for feeding a charge to the cylinder, a piston slidable within the cylinder for compressing the charge within the cylinder, a valve seat insert arranged in said inlet, an edge formed on said valve seat insert, means defining an aperture in the insert whose periphery is formed by said edge, an annular valve-engaging surface extending around said means defining an aperture, a first area of said means defining an aperture lying to one side of a plane including the axis of said annular valve-engaging surface, a second area of said means defining an aperture lying on the other side of said plane, said first area being larger than said second area, means bounding said second area including at least one curved section whereby an incoming charge passing to said insert in a path generally parallel to the axis of said valve-engaging surface is deflected from said path on passage through said means defining an aperture, the charge, when deflected, travelling in directions and having a velocity profile thereacross which are controlled by the shape of said at least one curved section.

According to a third aspect of the invention, there is provided a valve seat insert for an inlet valve of a reciprocating internal combustion engine and comprising an annular insert portion, a radially inner edge to said annular portion, a part of said edge defining the major portion of an edge of an aperture for the passage of an air/fuel mixture through said insert, an annular valve seat formed on said annular insert portion for sealing co-operation with a valve, a deflector arranged within the annular insert portion, at least one curved section forming a radially innermost edge of the deflector and defining the minor, remaining portion of said edge of said aperture whereby the mixture is deflected on passage through the insert and leaves the insert with a direction of travel and velocity profile influenced by said insert.

BRIEF DESCRIPTION OF THE DRAWINGS

The following is a more detailed description of two embodiments of the invention, by way of example, reference being made to the accompanying drawings in which.

DESCRIPTION OF THE PREFERRED EMBODIMENTS

Figure 1:
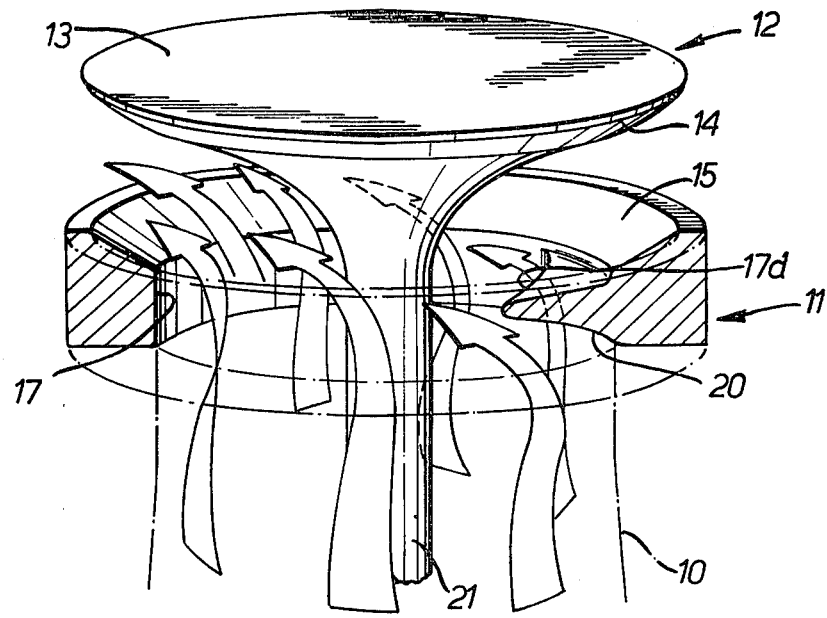
FIG. 1 is a view from one side, partly in section, of a valve seat insert and a co-operating valve of a reciprocating internal combustion engine.

Referring first to FIG. 1, a valve controlled inlet of an internal combustion engine comprises an inlet passage 10 leading from a supply of fuel/air mixture and terminating in an annular step(not shown) which holds a valve seat insert 11. A valve 12 has a stem 21 extending along the inlet passage 10 and passing through the valve seat insert 11 to terminate in a head 13 provided with the usual bevelled annular seating portion 14.

The valve seat insert 11 is made by a powder metallurgy process in which a suitable metal powder is compacted in a press having a cavity of corresponding shape and then heated to sinter the powder, for example as described in the specification of British Pat. No. 1,461,273. Alternatively, it may be cast.

The valve seat insert comprises an annular valve-engaging surface 15 which has a bevel which is a mating fit with the bevelled seating portion 14 of the valve head 13. The axis which is the centre of the annulus formed by said valve-engaging surface is designated at 16 in FIG. 2.

An edge 17 of the valve seat insert 11 defines the periphery of an aperture 18 through which the fuel/air mixture passes when the valve 12 is open. The shape of the aperture 18 is such that the area of said aperture 18 to one side of a plane 22 including the axis 16 is larger than the area of the aperture 18 to the other side of said plane.

This plane 22 divides the edge 17 of the valve seat insert 11 into a longer portion 17a bounding the larger area and a shorter portion 17b bounding the smaller area. The longer edge portion 17a is shaped as an arc of a circle whose centre lies on the axis 16 and which has a radius R. The shorter edge portion 17b includes a single concave curved section 17c formed from a central part 17d which has the shape of an arc of a circle whose radius is greater than the radius R and two end parts 17e, one at each end of the central part 17d. Each end part 17e is of variable curvature to provide a smooth transition between the central part 17d and the remainder of the shorter edge portion 17b.

As best seen in FIG. 1, the curved section 17c forms an edge of a flow-directing surface 20, which is before the valve-engaging surface 15 in the direction of travel of fuel/air mixture through the valve seat and which extends from the curved edge 17c in a direction radially outward relative to the axis 16.

The surface 20 is concavely curved in cross-sectional planes including the axis 16 and cutting the surface.

Figure 4:
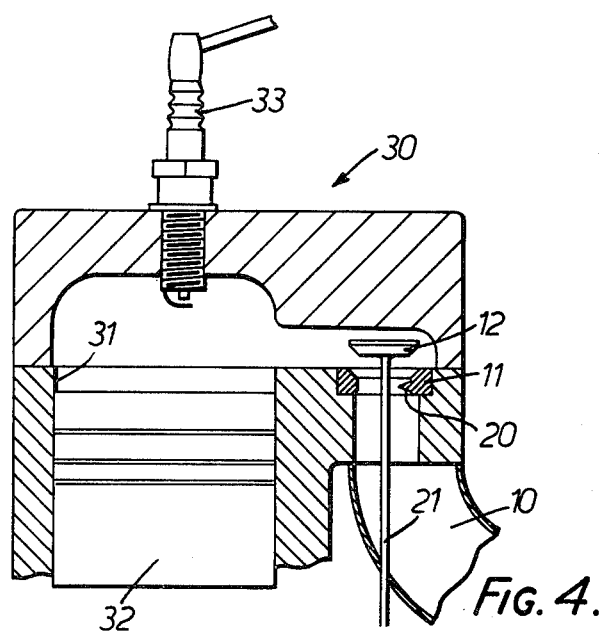
FIG. 4 is a diagrammatic cross-sectional view of part of a spark-ignition internal combustion engine showing the valve seat insert of FIGS. 1, 2 or 3 installed in such an engine.

In use, the valve seat insert is incorporated into an internal combustion engine 30 (FIG. 4) having one or more cylinders 31 within which a piston 32 reciprocates to compress a charge of air or of fuel/air mixture introduced into the cylinder through the valve-controlled inlet. The compressed mixture is ignited by compression of the charge, in a compression-ignition engine, or by a spark plug 33, in a spark-ignition engine, to move the piston in a working stroke before the products of combustion are exhausted through a valve controlled outlet. The valve controlled inlet receives the charge of air or of fuel/air mixture from an induction system as is well known.

The charge passing along the inlet passage 10 from the induction system travels in a path generally parallel to the axis 16, when the valve 12 is open. On reaching the valve seat insert 11 the charge is deflected from said path by the asymmetric shape of the aperture 18 and by the flow-directing surface 20 and the curved section 17c, and travels in a direction which is influenced by the curved section 17c, by the flow-directing surface 20 and by the valve stem 21 and in which the fuel/air mixture, in the case of a spark-ignition engine, is directed at the sparking plug 33 and has a velocity profile across the path in which the velocity of the fuel/air mixture in the centre of the path is increased relatively to the velocity of the mixture in the centre of the path before the valve seat insert 11. This is shown diagrammatically by the arrows A in FIG. 2. Thus a higher-speed portion of the fuel/air mixture is directed at the sparking plug with the remainder of the mixture dispersing through the cylinder in a turbulent manner, due to the velocity gradient imparted to the mixture. A similar effect is produced in a direct-injection compression-ignition engine by the velocity profile imparted to the charge air.

The motion of airborne fuel droplets in a cylinder of an internal combustion engine affects such engine characteristics as ease of starting, fuel economy and developed power. Although optimum fuel economy is obtained with a weaker fuel/air ratio than a stoichiometric mixture, operation through load and speed transients requires ratios greater than stoichiometric. In addition, a richer ratio provides a minimum of engine cranking on starting and more stable running as the engine warms up.

In a petrol engine having a carburettor, especially when the engine is cold, the mixture of fuel/air droplets passing along the inlet passage 10 has the fuel entrained in the air in the form of vapour, finely-divided droplets and somewhat larger droplets. The larger fuel droplets have a much higher inertia than the small droplets and the vapour and, when moving, have a higher directional stability than the smaller droplets and than the vapour.

Thus, as the fuel/air mixture is diverted by the valve seat insert 11 described above with reference to the drawings, the larger droplets are directed towards the spark plug and, due to their higher directional stability, reach the spark plug while the remainder of the fuel disperses into the cylinder. The shapes of the curved section 17c and of the low-directing surface 20 ensure that this change of direction is achieved smoothly with little turbulence and loss of momentum in the throat of the inlet port and also ensures that the larger droplets proceed in the required path towards the spark plug.

At the spark plug, the spark generates an ionised corona with zones around the corona containing a rapidly expanding gas plasma including several ignition nucleii on the boundaries of the zone. The raw fuel droplets feed these nucleii by providing sources of chemical radicals and thus sustain the flame in the cylinder once it has been initiated, to prevent flame extinction and mis-firing. Because the larger fuel droplets are not evenly spread throughout the cylinder but are directed around the spark plug, the spark plug operates in a zone in which the fuel/air ratio is apparently higher than the actual fuel/air ratio delivered from the supply. This action provides improved starting of a spark-ignition reciprocating internal combustion engine and also tends to yield greater power, better fuel economy and lower exhaust temperatures than engines having valve seat inserts in which the aperture is of a circular cross-section centred on the axis 16.

Figure 2:
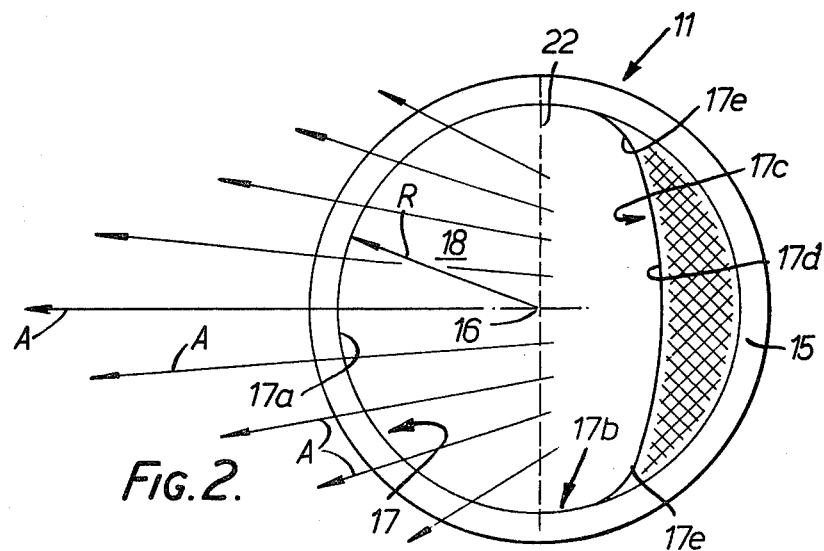
FIG. 2 is a plan view of the valve seat insert of FIG. 1.
Figure 3:
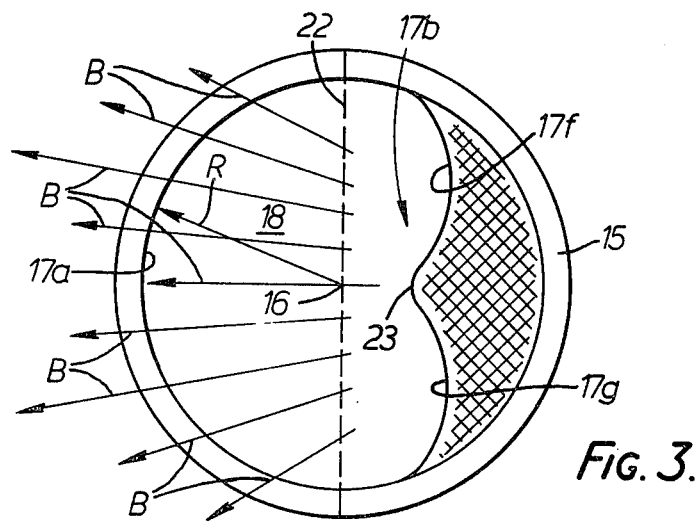
FIG. 3 is a plan view of a modified form of the valve seat insert of FIG. 2.

Referring next to FIG. 3, an alternative form of valve seat is shown in which parts common to FIGS. 1 and 2 and FIG. 3 bear the same reference numerals and will not be described in detail. In FIG. 3 the shorter edge portion 17b comprises two curved sections 17f and 17g each extending from a respective one of the ends of the longer edge portion 17a and meeting at a cusp 23 whose distance from the axis 16 is less than the radius R. The cusp 23 lies in a plane including the axis 16 and intersecting the longer edge portion 17a at a point along the length thereof intermediate the ends of the portion 17a.

In use, the embodiment of FIG. 3 diverts the charge air or fuel/air mixture passing along the inlet passage 10 into two diverging streams, the charge air or fuel/air mixture in each stream having a maximum velocity at the centre of the stream as shown diagrammatically in FIG. 3 by the arrows B. Such a flow of charge air or fuel/air mixture may be desirable in certain internal combustion engines, since it minimises losses resulting from flow round the valve stem 21.

It will be appreciated that more than two curved sections may be provided to give desired flow patterns and velocities of the charge or fuel/air mixture in the cylinder.

The longer edge portion 17b need not be the shape of an arc of a circle but may be of any required shape.

The type of valve seat insert described with reference to FIGS. 1 and 2 has been tested in a spark-ignition four-stroke petrol engine, and was found to give substantially improved fuel economy and better starting characteristics.

I claim:

1. A reciprocating internal combustion engine comprising:
   at least one cylinder,
   a valve-controlled inlet for feeding a charge to the cylinder,
   a piston slidable within the cylinder for compressing the charge within the cylinder,
   a valve seat insert arranged in said inlet,
   an edge formed on said valve seat insert,
   means defining an aperture in the insert whose periphery is formed by said edge,
   an annular valve-engaging surface extending around said means defining an aperture,
   a first area of said means defining an aperture lying to one side of a plane including the axis of said annular valve-engaging surface, said aperture being bounded by a longer portion of said edge having the shape of a part of the circumference of a circle whose centre lies on the axis of the annular valve-engaging surface,
   a second area of said means defining an aperture lying on the other side of said plane, said first area being larger than said second area,
   means bounding said second area including two curved sections each extending from an end of said longer edge portion and meeting at a cusp whose distance from the centre of said circle defining said edge portion is less than the radius of said circle whereby an incoming charge passing to said insert in a path generally parallel to the axis of said valve-engaging surface is deflected from said path on passage through said means defining an aperture, the charge, when deflected, travelling in directions having a velocity profile thereacross which are controlled by the shape of said two curved sections.

2. An engine according to claim 1 wherein each of said two curved sections forms the edge of a flow-directing surface which is concave in cross-section and extends radially outward relative to said axis.

3. An engine according to claim 1 wherein the charge is a fuel/air mixture and wherein the insert directs the charge towards ignition means in the cylinder.

4. A vale seat insert for an inlet valve of a reciprocating internal combustion engine and comprising
   an edge,
   means defining an aperture in the insert whose periphery is formed by said edge,
   an annular valve-engaging surface extending around said means defining an aperture,
   a first area of said mean defining an aperture lying to one side of a plane including the axis of said annular valve-engaging surface, said aperture being bounded by a longer portion of said edge having the shape of a part of the circumference of a circle whose centre lies on the axis of the annular valve-engaging surface,
   a second area of said means defining an aperture lying on the other side of said plane, said first area being larger than said second area,
   means bounding said second area including two curved sections each extending from an end of said longer edge portion and meeting at a cusp whose distance from the centre of said circle defining said edge portion is less than the radius of said circle whereby an incoming charge passing to said insert path generally parallel to the axis of said valve-engaging surface is deflected from said path on passage through said means defining an aperture, the charge, when deflected, travelling in directions having a velocity profile thereacross, which are controlled by the shape of said two curved sections.

5. An insert according to claim 4 wherein each of said two curved sections forms the edge of a flow-directing surface which is concave in cross-section and extends radially outwardly relative to said axis.

6. An insert according to claim 4 wherein said two curved sections are bounded by a portion of said edge of said valve seat insert.

7. An insert according to claim 4 wherein the cusp lies in a plane which includes the axis of the annular valve-engaging surface and which intersects the longer edge portion at a point along the length thereof intermediate the ends thereof.

8. An insert according to claim 4 wherein each of said two curved sections of the valve seat insert has associated therewith a flow-directing surface which extends from said portion in a radially-outward direction relatively to the axis of the annular valve-engaging surface and which, in planes including said axis and cutting said surface, is concavely curved.

* * * * *